(12) United States Patent
Tarapaski

(10) Patent No.: US 11,560,907 B2
(45) Date of Patent: Jan. 24, 2023

(54) DEVICE FOR AMPLIFYING A FORCE, AND RELATED SYSTEMS AND METHODS

(71) Applicant: Alan Tarapaski, Saanichton (CA)

(72) Inventor: Alan Tarapaski, Saanichton (CA)

(*) Notice: Subject to any disclaimer, the term of this patent is extended or adjusted under 35 U.S.C. 154(b) by 0 days.

(21) Appl. No.: 16/875,677

(22) Filed: May 15, 2020

(65) Prior Publication Data

US 2021/0355971 A1    Nov. 18, 2021

(51) Int. Cl.
| | |
|---|---|
| *F15B 15/08* | (2006.01) |
| *F16H 21/10* | (2006.01) |
| *F15B 15/20* | (2006.01) |
| *F16H 19/08* | (2006.01) |

(52) U.S. Cl.
CPC ........... *F15B 15/088* (2013.01); *F16H 19/08* (2013.01); *F16H 21/10* (2013.01); *F15B 2015/206* (2013.01)

(58) Field of Classification Search
CPC ........ F15B 7/005; F15B 7/006; F15B 15/088; B60T 11/18; F16H 21/48; F16H 21/44; F16H 21/10

See application file for complete search history.

(56) References Cited

U.S. PATENT DOCUMENTS

| | | | | |
|---|---|---|---|---|
| 2,541,312 A | * | 2/1951 | Vogel | B60T 11/18 |
| | | | | 60/589 |
| 3,333,418 A | * | 8/1967 | Harvey | F15B 7/005 |
| | | | | 60/584 |

* cited by examiner

*Primary Examiner* — Thomas E Lazo
*Assistant Examiner* — Daniel S Collins
(74) *Attorney, Agent, or Firm* — John Janeway; Janeway Patent Law PLLC

(57) ABSTRACT

A device for amplifying a force includes a prime mover configured to receive a first force, and a secondary mover configured to generate a second force that is greater than the first force in response to the prime mover receiving the first force. The prime mover includes an output that, in response to the first force, rotates about a first axis through a power stroke defined by an angular displacement that is less than ninety degrees. The prime mover's output includes a first end that revolves about the first axis during the power stroke. The secondary mover includes an input, an output, and a body. The input includes a second end that is coupled with the first end of the prime mover's output, and that, as the first end of the prime mover's output revolves about the first axis through the power stroke, the second end of the secondary mover's input also revolves about the first axis and moves relative to the secondary mover's body. The secondary's mover's output is configured to apply the second force to an object. The secondary mover's body is pivotally anchored at a location such that as the first end of the prime mover's output revolves about the first axis through the power stroke, the body of the secondary mover pivots about a second axis that passes through the location. The position of the device's secondary mover relative to the first end of the prime mover's output is such that, as the first end approaches the end of the power stroke, the first end of the prime mover's output accelerates, without an additional force applied to the prime mover's output.

15 Claims, 4 Drawing Sheets

DEVICE FOR AMPLIFYING A FORCE, AND RELATED SYSTEMS AND METHODS

BACKGROUND

Devices that receive a force input and, in response, generate a force output that is greater than the force input are ubiquitous. For example, a block and pulley, and/or a lever and fulcrum, are often used by a person to lift things that weigh much more than a person could lift with just his arms and legs. With such devices, a human body by itself can move things that it otherwise would not be able to by providing the force input to the device and having the device apply a force output to the thing. Sometimes forces that a human body might be able to generate by itself require the force to be generated for a long period of time or repeatedly generated over and over. If a human body generated such forces by itself, the body would tire quickly and not be able to sustain the force through the required duration or sustain the force through a series of repetitions.

These force-amplifying devices, however, typically do not include a component that accelerates, without any additional force input, to generate an output force. With acceleration, one can use momentum to help generate the output force, and further increase the difference between the output force and the input force.

Thus, there is a need for a device that uses acceleration and momentum to generate an output force from an input force that is less than the output force.

SUMMARY

In an aspect of the invention, a device for amplifying a force includes a prime mover configured to receive a first force, and a secondary mover configured to generate a second force that is greater than the first force in response to the prime mover receiving the first force. The prime mover includes an output that, in response to the first force, rotates about a first axis through a power stroke defined by an angular displacement that is less than ninety degrees. The prime mover's output includes a first end that revolves about the first axis during the power stroke. The secondary mover includes an input, an output, and a body. The input includes a second end that is coupled with the first end of the prime mover's output, and that, as the first end of the prime mover's output revolves about the first axis through the power stroke, the second end of the secondary mover's input also revolves about the first axis and moves relative to the secondary mover's body. The secondary's mover's output is configured to apply the second force to an object. The secondary mover's body is pivotally anchored at a location such that as the first end of the prime mover's output revolves about the first axis through the power stroke, the body of the secondary mover pivots about a second axis that passes through the location. The position of the device's secondary mover relative to the first end of the prime mover's output is such that, as the first end approaches the end of the power stroke, the first end of the prime mover's output accelerates, without an additional force applied to the prime mover's output.

With the device one can amplify the force input to the device and then apply the amplified force to do work. For example, one can lift a mass that weighs about three times the force input to the device. With the acceleration of the first end of the prime mover's output during the power stroke, the device can use the momentum generated in the prime mover's output to further increase the second force generated by the device. Thus, one can use the device to increase the amplification of a force input to the device to do more work than would otherwise be done.

In another aspect of the invention, a method for amplifying a force includes the following: a) rotating an output of a prime mover about a first axis, in response to applying a first force to the prime mover; b) revolving a first end of the prime mover's output through a power stroke defined by an angular displacement that is less than ninety degrees; c) revolving a second end of an input of a secondary mover about the first axis, wherein the second end is coupled with the first end of the prime mover's output; d) pivoting a body of the secondary mover about a second axis, wherein the body is pivotally anchored at a location and the second axis passes through the location; e) generating a second force in the output of the secondary mover, in response to the movement of the second end of the secondary mover's input, and the movement of the body of the secondary mover about the second axis, wherein the second force is greater than the first force.

BRIEF DESCRIPTION OF THE FIGURES

Each of the FIGS. 4A and 4B shows a view of yet another device for amplifying a force, according to yet another embodiment of the invention.

DETAILED DESCRIPTION

Figure 1:
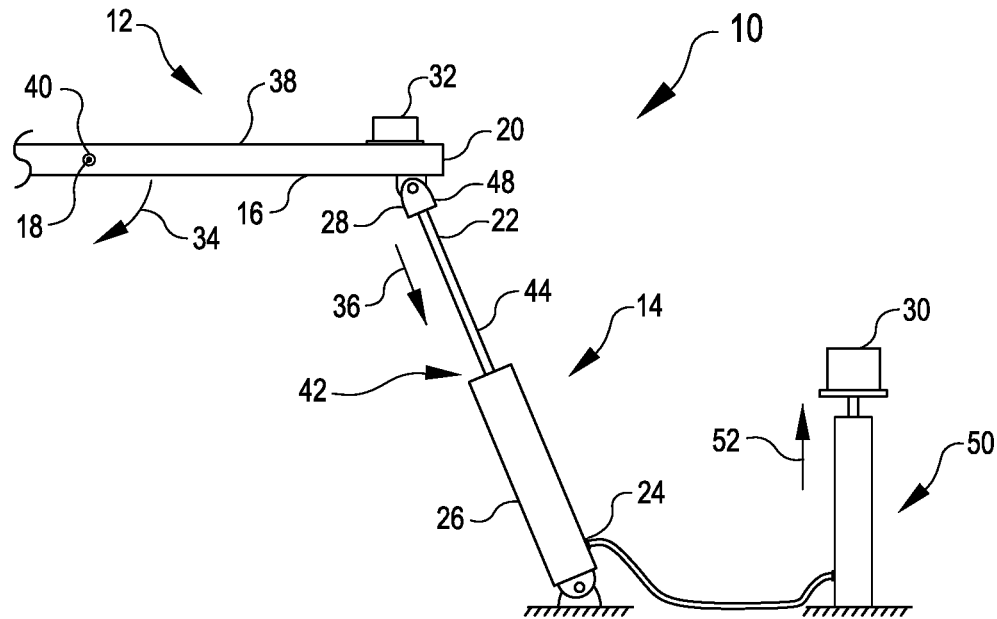
FIG. 1 shows a view a device for amplifying a force, according to an embodiment of the invention.

FIG. 1 shows a view of a device 10 for amplifying a force, according to an embodiment of the invention. The device 10 includes a prime mover 12 and a secondary mover 14. The prime mover 12 includes an output 16 that can rotate about a first axis 18, and that includes a first end 20 that revolves about the first axis 18 as the output rotates about the axis 18. The secondary mover 14 includes an input 22, an output 24, and a body 26. The input 22 includes a second end 28 that is coupled with the first end 20 of the prime mover's output 16. The secondary's mover's output 24 is configured to apply a force to an object (here fluid pressure to a piston and cylinder to raise the weight 30), and the secondary mover's body 26 is pivotally anchored at a location (here the ground).

In operation, an input force or first force is applied to the prime mover 12. This force may be a mass 32 placed on top of the prime mover's output 16, or a torque applied about the first axis 18. In response to this force or torque, the output 16 rotates about the first axis 18 in the direction shown by the arrow labeled 34. This causes the first end 20 to revolve about the axis 18. This, in turn, causes the secondary mover's input 22 to move relative to the first axis 18 in the direction shown by the arrow 34, and relative to the secondary mover's body 26 in the direction shown by the arrow labeled 36. The secondary mover 14 uses this movement of its input 22 to generate an output force or second force that is greater than the input force or first force. As shown and discussed in greater detail in conjunction with FIG. 2, the angular displacement that the first end 20 of the prime mover's output 16 travels through to move the secondary mover's input 22 toward the secondary mover's body 26 is the power stroke of the device 10. As the output 16 of the prime mover 12 approaches the end portion of the power stroke (here about 20 to 45 degrees below the output 16), the rotation of the prime mover's output 16 accelerates, which increases the momentum of the prime mover's output 16. This increase in momentum, in turn, urges the secondary mover's input to convey more force to the secondary mover 14, and thus, allow the secondary mover to increase the amount of force that it generates.

With the device 10 one can amplify the force input to the device and then apply the amplified force to do work. For example, one can lift the mass 30 that weighs about three times the force input to the device. With the acceleration of the first end 20 of the prime mover's output 16 during the power stroke, the device 10 can use the momentum generated in the prime mover's output 16 to further increase the second force generated by the device 10. Thus, one can use the device 10 to increase the amplification of a force input to the device 10 to do more work than would otherwise be done. Additional examples of such work that become more economical with the device 10 include: 1) storing hydrogen gas, 2) compressing fluids, 3) crushing solids, 4) generating energy independent of or off the grid, and 5) pumping fluids.

The prime mover 12 may be configured as desired. For example, in this and other embodiments, the prime mover 12 includes a beam 38 that is pivotally coupled via a pin 40 through which the first axis 18 passes. In this configuration, the pin 40 is a fulcrum of the prime mover 12, and the beam 38 is the output 16 of the prime mover 12. In response to an input force, the beam 38 rotates about the pin 40 in the direction of the arrow 34, but does not translate relative to the pin 40. In addition, the output 16 is balanced about the pin 40 such that if the beam 38 were not coupled to the input 22 of the secondary mover 14, the beam 38 (without the mass 32 lying on top of it) would lie level (as shown in FIG. 1). In this and other embodiments, the beam is stiff—i.e., it maintains its shape as it rotates about the pin 40, it does not buckle or bend. In this configuration, the distance between the pin 40 and the first end 20, where the secondary mover's input 22 is coupled, remains the same as the prime mover's output 16 travels through the power stroke. Here, the distance between the pin 40 and the first end 20 where the input 22 is coupled is about 4.5 feet. This distance, however, may be less than 4.5 feet or more than 4.5 feet.

Other embodiments are possible. For example, the prime mover 12 may include two or more beams, each coupled to the same fulcrum or to a respective one of many fulcrums. For another example, the beam 34 may be flexible enough to change its shape, such as bend or slightly deflect, in response to the prime mover 12 receiving an input force.

Still referring to FIG. 1, the secondary mover 14 may also be configured as desired. For example, in this and other embodiments, the secondary mover 12 includes a piston-and-cylinder assembly 42 that has a piston 44, and a cylinder (not shown) disposed in the secondary mover's body 26. The piston has an end 48 that is pivotally coupled to the prime mover's first end 20, and a head (also not shown) disposed inside the cylinder. In this configuration, the secondary mover's input 22 includes the piston 44, the secondary mover's body 26 includes the cylinder, and the secondary mover's output 24 includes a cavity (not shown) in the cylinder whose volume changes as the piston's head moves inside the cylinder. More specifically, the cavity holds a fluid (here hydraulic fluid) whose pressure increases as the movement of the piston's head reduces the cavity's volume. Thus, when the end 48 of the piston revolves about the prime mover's pin 40, the piston's head is urged in the direction of the arrow 36 and reduces the volume of the cavity in the cylinder. This, in turn, increases the pressure of the fluid held in the cavity. When the pressure of the fluid increases, the pressure of the fluid inside the other piston-and-cylinder 50 on which the mass 30 sits, also increases. When this pressure is sufficient to move the mass 30, the piston in the other piston-and-cylinder 50 moves in the direction shown by the arrow 52.

Other embodiments are possible. For example, the secondary mover 14 may include two or more piston-and-cylinders, each coupled to the same first end 20 of the prime mover 12, or to a respective first end 20 of many beams 38 of the prime mover 12. For another example, two or more piston-and-cylinders may each be coupled to a single beam 38 of the prime mover 12, but at a respective one of many different distances away from the prime mover's pin 40. For yet another example, the secondary mover may be small in size or large in size.

The body 26 of the secondary mover 14 may be pivotally anchored at any desired location relative to the prime mover that allows the first end 20 of the prime mover's output 16 to accelerate while the first end travels through the end portion of the power stroke. For example, in this and other embodiments the secondary mover's body 26 is pivotally anchored at a location that is farther away from the first axis 18 than the prime mover's first end 20. More specifically, this location is also less than twice the distance from the first axis 18 to the prime mover's first end 20.

Figure 2:
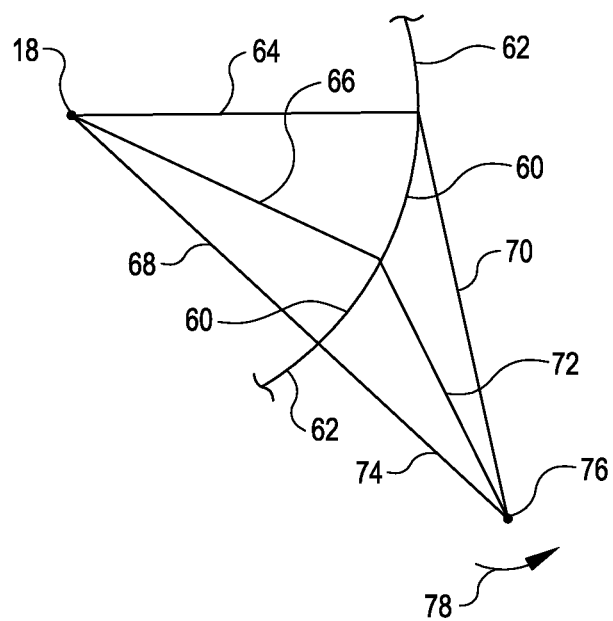
FIG. 2 shows a schematic view of the power stroke of the device in FIG. 1, according to an embodiment of the invention.

FIG. 2 shows a schematic view of the power stroke of the device 10 in FIG. 1, according to an embodiment of the invention. The configuration of the prime and secondary movers 12 and 14, respectively, as well as the position of each relative to the other, establishes the power stroke of the device 10. By changing the configuration of one or both of the movers 12 and 14, and/or changing the position of each mover 12 and 14 relative to the other, one can establish a variety of different power stroke configurations as desired.

For example, in this and other embodiments the power stroke is defined by a segment 60 of a circular arc 62 that the first end 20 travels through. More specifically, the arc 60 of the power stroke starts at zero degrees which is arbitrarily defined as the angular location of the prime mover's beam 38 about the axis 18 when the beam 38 is level as shown in FIG. 1, and proceeds clockwise. Each of the lines 64, 66 and 68 in FIG. 2 shows the location of the prime mover's first end 20 at a respective one of three locations within the device's power stroke. Line 64 shows the location of the first end 20 at the start of the power stroke (zero degrees on the arc of power stroke). Line 66 shows the location of the first end 20 at the start of the end portion of the power stroke, where the end 20 begins to accelerate. In this and other embodiments, this location is 20 degrees below the start of the power stroke. Line 68 shows the location of the first end 20 at the end of the power stroke, where the first end 20 no longer provides the secondary mover 14 a force that the secondary mover 14 can amplify. In this and other embodiments, this location is 45 degrees below the start of the power stroke.

In this and other embodiments, each of the lines 70, 72 and 74 in FIG. 2 shows the location of the secondary mover's second end 24 at a respective one of the same three locations within the device's power stroke as those shown for the first end 20. In addition, each of the lines 70, 72 and 74 shows how the secondary mover's body 26 rotates about a second axis 76 in the direction shown by the arrow labeled 78, while the body 26 of the secondary mover 14 is pivotally anchored. Line 70 shows the location of the second end 24 at the start of the power stroke. Line 72 shows the location of the second end 24 at the start of the end portion of the power stroke, where the first end 20 begins to accelerate. Line 74 shows the location of the second end 24 at the end of the power stroke, where the first end 20 no longer provides the secondary mover 14 a force that the secondary mover 14 can amplify.

Figure 3:
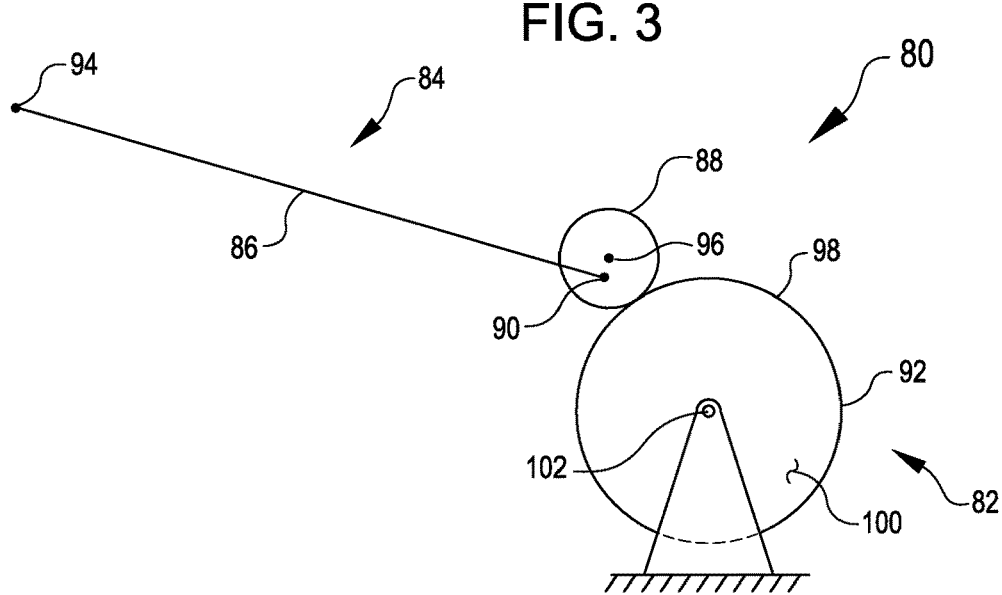
FIG. 3 shows a view of another device for amplifying a force, according to another embodiment of the invention.

FIG. 3 shows a view of another device 80 for amplifying a force, according to another embodiment of the invention. The device 80 is similar to the device 10 except that the output force of the secondary mover 82 is torgue, not fluid pressure. In this and other embodiments, the prime mover 84 is similar to the prime mover 12 except that the prime mover's output 86 includes a gear 88 that rotates about a third axis 90. To account for the change in the distance between the contact point where the gear 88 contacts the secondary mover 92 and the first axis 94, the location of the third axis 90 is offset from the center 96 of the gear 88. Similarly, the secondary mover 92 is similar to the secondary mover 14 except that the secondary mover 92 includes a plurality of gear teeth 98 disposed on a perimeter of a frame 100. As the prime mover's gear 88 travels through the device's power stroke, the secondary mover's frame rotates about the second axis 102.

Figure 4A:
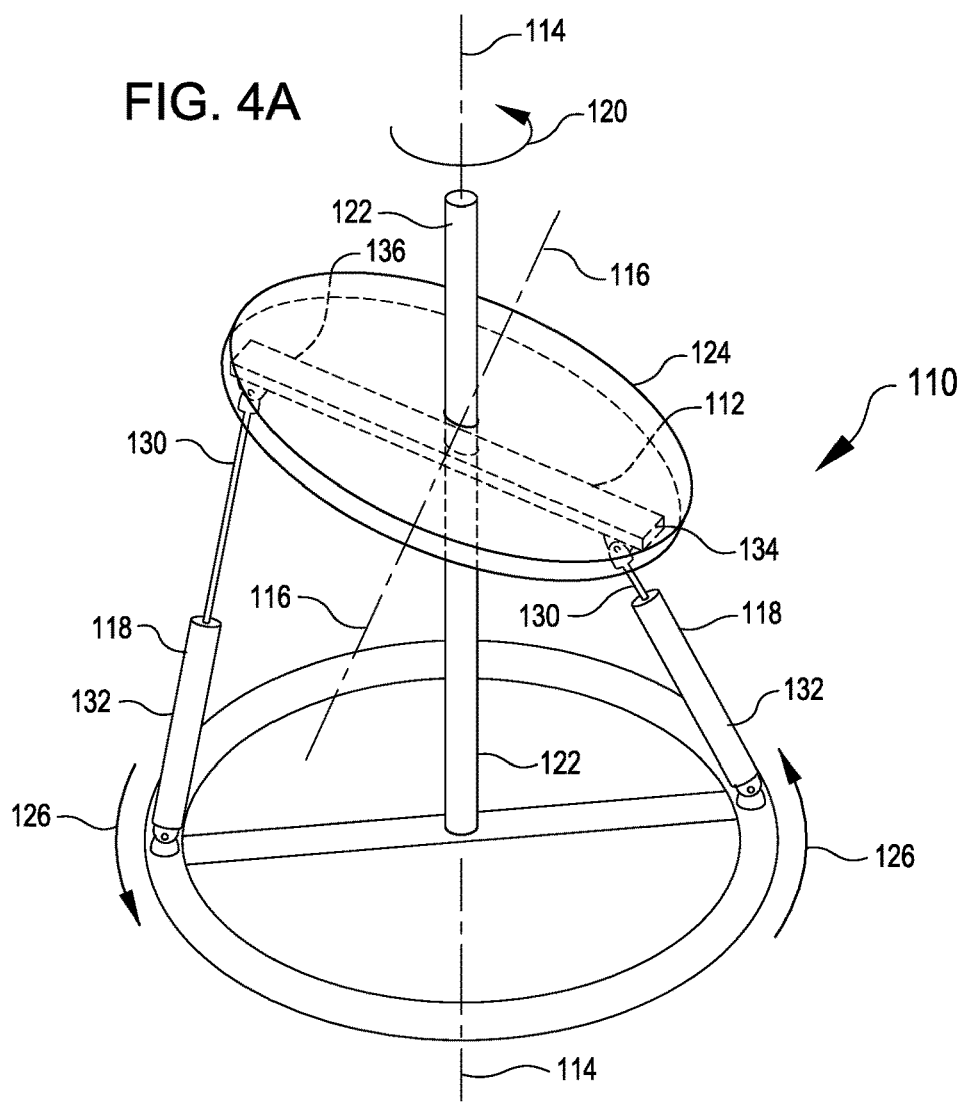
FIG. 4A shows a perspective view of the device.
Figure 4B:
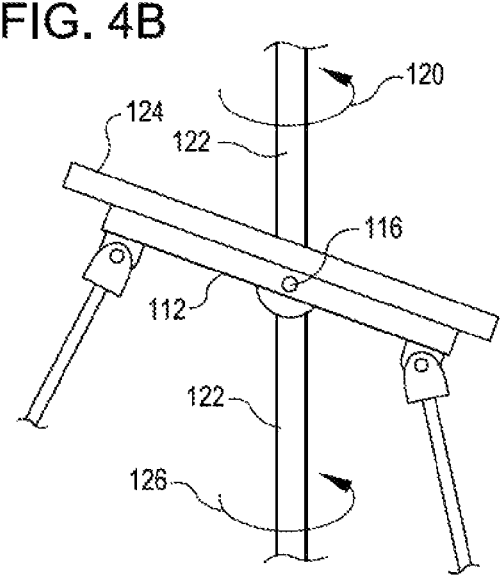
FIG. 4B shows a partial elevation view of the device.

Each of the FIGS. 4A and 4B shows a view of yet another device 110 for amplifying a force, according to yet another embodiment of the invention. FIG. 4A shows a perspective view of the device 110, and FIG. 4B shows a partial, elevation view of the device 110. The device 110 is similar to the device 10 shown in FIG. 1, except that the device 110 includes a prime mover 112 that rotates about two axes 114 and 116 as the device 110 amplifies an input force, and a secondary mover 118 that also rotates about the axis 114 as the device 110 amplifies an input force. The input force is a torque 120 applied to the axle 122. The prime mover 112 also includes a swash plate 124 that is coupled to the axle 122 at an angle (shown in FIG. 4B) that is other than perpendicular to the axis 114, but does not rotate with the axle 122 and the secondary mover 118 in the direction indicated by the arrows 126. With the swash plate 124 at an angle, the swash plate 124 pushes the secondary mover's input 130 toward the secondary mover's body 132 during the power stroke half of the secondary mover's revolution about the axis 114 by pushing the end 134 of the prime mover's output 136 toward the secondary mover's body 132. In the second half of the secondary mover's revolution about the axis 114, the secondary mover's input 130 is pulled away from the body 132, by the second secondary mover 118 proceeding through its power stroke half of its revolution about the axis 114.

The angle of the swash plate 124 may be any desired angle other than 90 degrees relative to the axis 114, and the location of the prime mover 112 relative to the swash plate 124 may be any desired location that forces the prime mover 112 to rotate about the axis 116 while the prime mover 112 and secondary mover 118 revolve about the axis 114. For example, in this and other embodiments, the prime mover 112 is located very close to the swash plate 124 as shown in FIG. 4B, and the swash plate 124 is angled about 30 degrees relative to the axis 122. In other embodiments, the prime mover 112 is located a distance away from the swash plate 124, This might be advantageous to reduce the amount of friction between the swash plate 124 and prime mover 112 as the prime mover 112 moves relative to the swash plate 124.

Other embodiments are possible. For example, each of the secondary movers 118 may be configured to generate pressure in a fluid held in its body 132 when the input 130 of each moves both toward the body 132 and away from the body 132. This in effect would be similar to a double acting pump. For another example, the secondary mover 118 may include a single input 130 and single body 132, or more than two inputs 130 and corresponding bodies 132.

Figure 5:
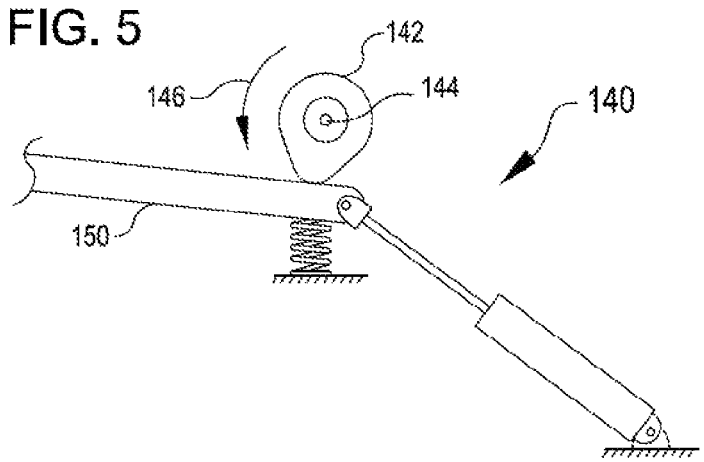
FIG. 5 shows a view of another device for amplifying a force, according to another embodiment of the invention.

FIG. 5 shows a view of another device 140 for amplifying a force, according to another embodiment of the invention. The device 140 is similar to the device 10 shown in FIG. 1, except the device 140 receives an input force from a source that is different than is shown in FIG. 1. More specifically, in this and other embodiments the device receives an input force from a cam 142 that rotates about the axis 144 in the direction indicated by the arrow labeled 146, and the device 140 includes a spring 148 to keep the output 150 of the device in contact with the cam 142. In this manner the spring 148 resets the device's output 150 to the beginning of the device's power stroke.

Figure 6:
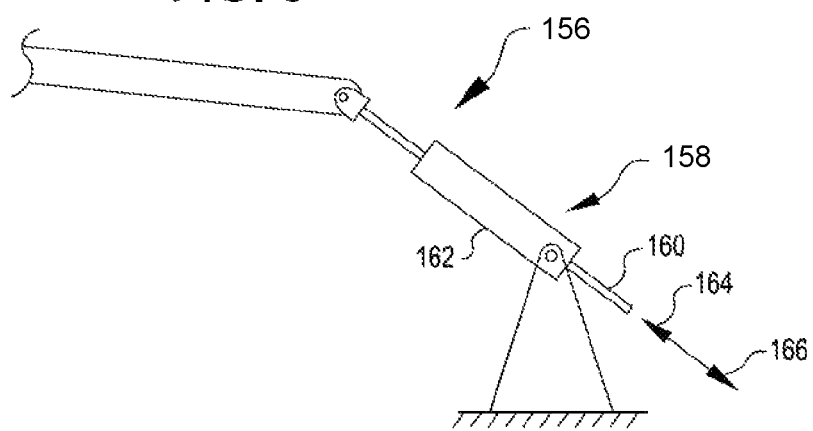
FIG. 6 shows a view of still another device for amplifying a force, according to still another embodiment of the invention.

FIG. 6 shows a view of still another device 156 for amplifying a force, according to still another embodiment of the invention. The device 156 is similar to the device 10 shown in FIG. 1, except the secondary mover 158 of the device 156 includes an output 160 that moves relative to the secondary mover's body 162 in the directions indicated by the arrows 164 and 166. With this and other embodiments, the output 160 of the secondary mover 158 can be used as a brake to control a force by applying the force to be controlled as an input force to the device 156.

Figure 7:
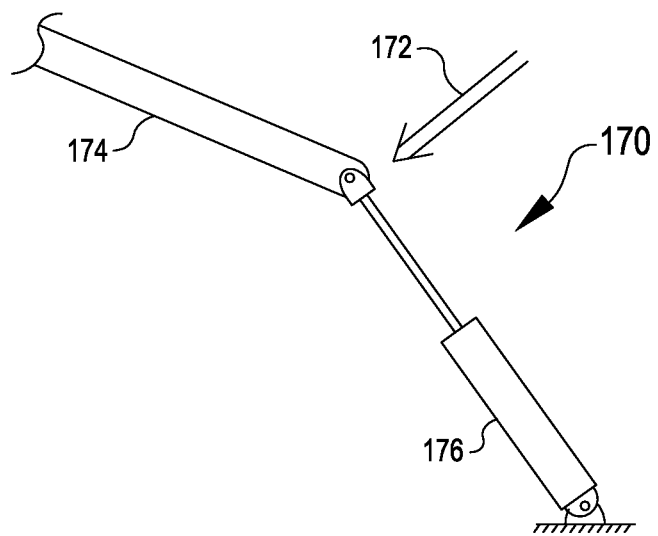
FIG. 7 shows a view of yet another device for amplifying a force, according to yet another embodiment of the invention.

FIG. 7 shows a view of yet another device 170 for amplifying a force, according to yet another embodiment of the invention. The device 170 is also similar to the device 10 shown in FIG. 1, except the device 170 receives an input force 172 that is applied to both the device's prime mover 174 and the device's secondary mover 176.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:
1. A device for amplifying a force, the device comprising:
a prime mover configured to receive a first force, and having an output that, in response to the first force applied to the prime mover, rotates about a first axis through a power stroke defined by an angular displacement that is less than ninety degrees, wherein the output includes a first end that revolves about the first axis during the power stroke;
a secondary mover configured to generate, in response to the rotation of the prime mover's output, a second force that is greater than the first force, the secondary mover having an input, an output, and a body, wherein:

the input includes a second end that is coupled with the first end of the prime mover's output, and that, as the first end of the prime mover's output revolves about the first axis through the power stroke, the second end of the secondary mover's input also revolves about the first axis and moves relative to the secondary mover's body;

the output of the secondary mover is configured to apply the second force to an object;

the body is pivotally anchored at a location such that as the first end of the prime mover's output revolves about the first axis through the power stroke, the body of the secondary mover pivots about a second axis that passes through the location; and wherein the position of the secondary mover relative to the first end of the prime mover's output is such that, as the first end approaches the end of the power stroke, the speed of the first end of the prime mover's output increases, without an additional force applied to the prime mover's output.

2. The device of claim 1 wherein the output of the prime mover includes a beam pivotally coupled with a fulcrum.

3. The device of claim 1 wherein:

the output of the prime mover includes a beam that has the first end, and that is pivotally coupled with a fulcrum a distance away from the first end, and the first axis passes through the fulcrum such that the first end of the beam revolves about the first axis.

4. The device of claim 1 wherein:

the output of the prime mover includes a beam that has the first end, and that is pivotally coupled with a fulcrum a distance away from the first end, and the power stroke includes an angular displacement of the beam about the fulcrum, between 0 degrees and 45 degrees with 0 degrees being level and 45 degrees being at a location below level in the clockwise direction.

5. The device of claim 4 wherein the first end of the prime mover's output accelerates as the output travels through an angular displacement between 20 degrees and 45 degrees.

6. The device of claim 1 wherein:

the input of the secondary mover includes a piston, the body of the secondary mover includes a cylinder, and the output of the secondary mover includes a cavity disposed inside the cylinder, wherein the piston is coupled with the first end of the prime mover's output and is disposed inside a cylinder such that, as the first end of the prime mover's output rotates through the power stroke, the piston compresses a working fluid inside the cavity.

7. The device of claim 1 wherein the body is pivotally anchored at a location that is farther away from the first axis than the first end of the prime mover's output.

8. The device of claim 1 wherein the body is pivotally anchored at a location that is farther away from the first axis than the first end of the prime mover's output, but less than twice the distance from the first axis to the first end of the prime mover's output.

9. A method for amplifying a force, the method comprising:

rotating an output of a prime mover about a first axis, in response to applying a first force to the prime mover;

revolving a first end of the prime mover's output through a power stroke defined by an angular displacement that is less than ninety degrees;

revolving a second end of an input of a secondary mover about the first axis, wherein the second end is coupled with the first end of the prime mover's output;

pivoting a body of the secondary mover about a second axis, wherein the body is pivotally anchored at a location that the second axis passes through, wherein the position of the secondary mover relative to the first end of the prime mover's output is such that, as the first end approaches the end of the power stroke, the speed of the first end of the prime mover's output increases, without an additional force applied to the prime mover's output;

generating a second force in an output of the secondary mover, in response to the movement of the second end of the secondary mover's input, and the movement of the body of the secondary mover about the second axis, wherein the second force is greater than the first force.

10. The method of claim 9 wherein rotating the output of the prime mover about the first axis includes pivoting a beam about a fulcrum.

11. The method of claim 9 wherein revolving the first end of the prime mover's output through the power stroke includes revolving the first end through an angular displacement between 0 degrees and 45 degrees with 0 degrees being level and 45 degrees being at a location below level in the clockwise direction.

12. The method of claim 11 wherein revolving the first end of the prime mover's output through the power stroke includes allowing the speed of the first end to increase through an angular displacement between 20 degrees and 45 degrees.

13. The method of claim 9 wherein revolving the second end of the input of the secondary mover about the first axis includes revolving and end of a piston that is coupled with the first end and disposed inside a cylinder of the body.

14. The method of claim 9 wherein revolving the second end of the input of the secondary mover about the first axis includes moving a piston disposed inside a cylinder to compress a working fluid located in a cavity of the cylinder.

15. The method of claim 9 wherein the body includes a cylinder and pivoting the body of the secondary mover about the second axis includes pivoting the cylinder about the second axis.

* * * * *